Jan. 29, 1952

F. SCOWEN 2,583,711

ELECTRONIC SWITCHING SYSTEM

Filed March 24, 1950

4 Sheets-Sheet 1

Inventor,
Frank Scowen,
by Hall & Houghton,
Attorneys.

Jan. 29, 1952 F. SCOWEN 2,583,711

ELECTRONIC SWITCHING SYSTEM

Filed March 24, 1950 4 Sheets-Sheet 2

Inventor,
Frank Scowen,
by Hall & Houghton
Attorneys.

Jan. 29, 1952 F. SCOWEN 2,583,711

ELECTRONIC SWITCHING SYSTEM

Filed March 24, 1950 4 Sheets-Sheet 3

Inventor,
Frank Scowen,
by Hall & Houghton,
Attorneys.

Jan. 29, 1952 F. SCOWEN 2,583,711

ELECTRONIC SWITCHING SYSTEM

Filed March 24, 1950 4 Sheets-Sheet 4

Inventor,
Frank Scowen,
by Hall & Houghton
Attorneys.

Patented Jan. 29, 1952

2,583,711

UNITED STATES PATENT OFFICE 2,583,711

ELECTRONIC SWITCHING SYSTEM

Frank Scowen, London, England

Application March 24, 1950, Serial No. 151,645
In Great Britain March 29, 1949

5 Claims. (Cl. 250—27)

Figure 1:
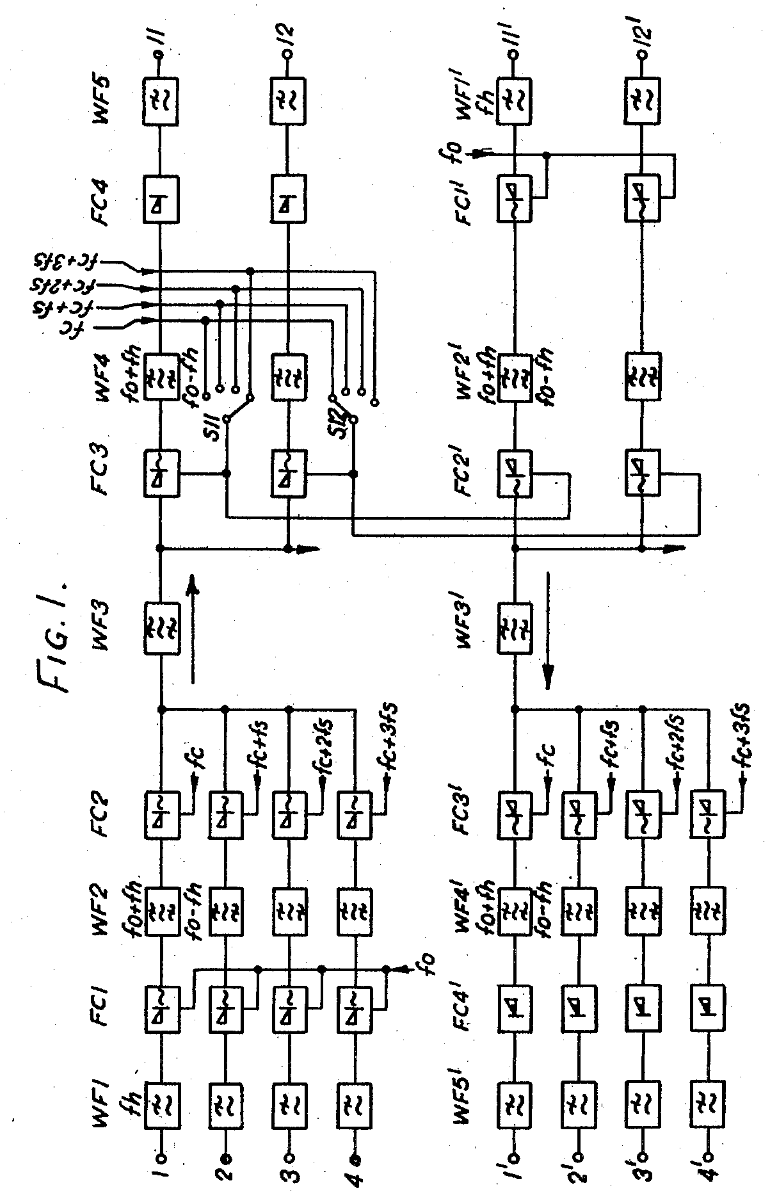

This invention relates to electronic switching systems of the kind which have become known as gating systems and has particular although not exclusive reference to gating circuits used in switching systems for effecting communication between units of apparatus or devices such as are included in telephone and similar systems.

According to the present invention an electronic gating circuit comprises in combination a trigger circuit with at least two operating leads, a restoring lead and an output lead, and a variable attenuation circuit which has an input and an output circuit and a control lead connected to said output lead.

A gating circuit according to the invention is preferably arranged to operate so that only when suitable electrical stimuli are applied simultaneously to at least two operating leads does the trigger circuit operate and produce an electrical stimulus on its output lead, which stimulus remains present when any or all of the input stimuli are removed and the output stimulus is removed from the trigger circuit output lead only by the application of a suitable stimulus applied to the gating circuit restoring lead.

In a system employing a plurality of gating circuits according to the invention, in which the individual trigger circuits have two operating leads, one operating lead in each trigger circuit is connected to a common output circuit marking lead the other operating lead forms an input circuit marking lead and each restoring lead is connected to a common restoring lead, each variable attenuation circuit having its input circuit connected to a separate signal source and its output circuit connected in common to the output circuits of the other variable attenuation circuits.

A particular form of gating circuit according to the invention comprises a 3-electrode gas discharge tube connected to a variable loss network comprising means whose resistance can be controlled by a polarising current, the gas discharge tube circuit including an anode load impedance connecting the anode to a source of positive potential and in which the restoring lead is connected to the anode of the gas discharge tube and a cathode resistor connects the cathode to earth, the control lead of the variable attenuation circuit being connected to the cathode of the gas discharge tube.

The operating leads are connected to the striker electrode of the gas discharge tube via resistors of substantially the same resistance and the variable loss circuit comprises a series connection of a first resistor, a first and second rectifier and a second resistor, with capacitors joining the junctions between the two resistors and the rectifiers to the input and output circuits of the variable loss circuit. The junction between the two rectifiers is connected to earth through a capacitor and a resistor connected in series. The free end of the first resistor constitutes the control lead which is connected to the cathode of the gas discharge tube and the free end of the second resistor is connected to a source of low positive potential, the rectifiers being conducting when the cathode of the gas discharge tube is at a higher potential than the source of low positive potential to which the free end of the second resistor is connected. The marking and indicating stimuli applied to the two operating leads are positive potentials of magnitude somewhat greater than the potential difference needed between the cathode and the striker electrode to strike the gas discharge tube and the restoring stimulus applied to the anode is a negative impulse of amplitude greater than the anode to cathode maintaining potential.

Figure 2:
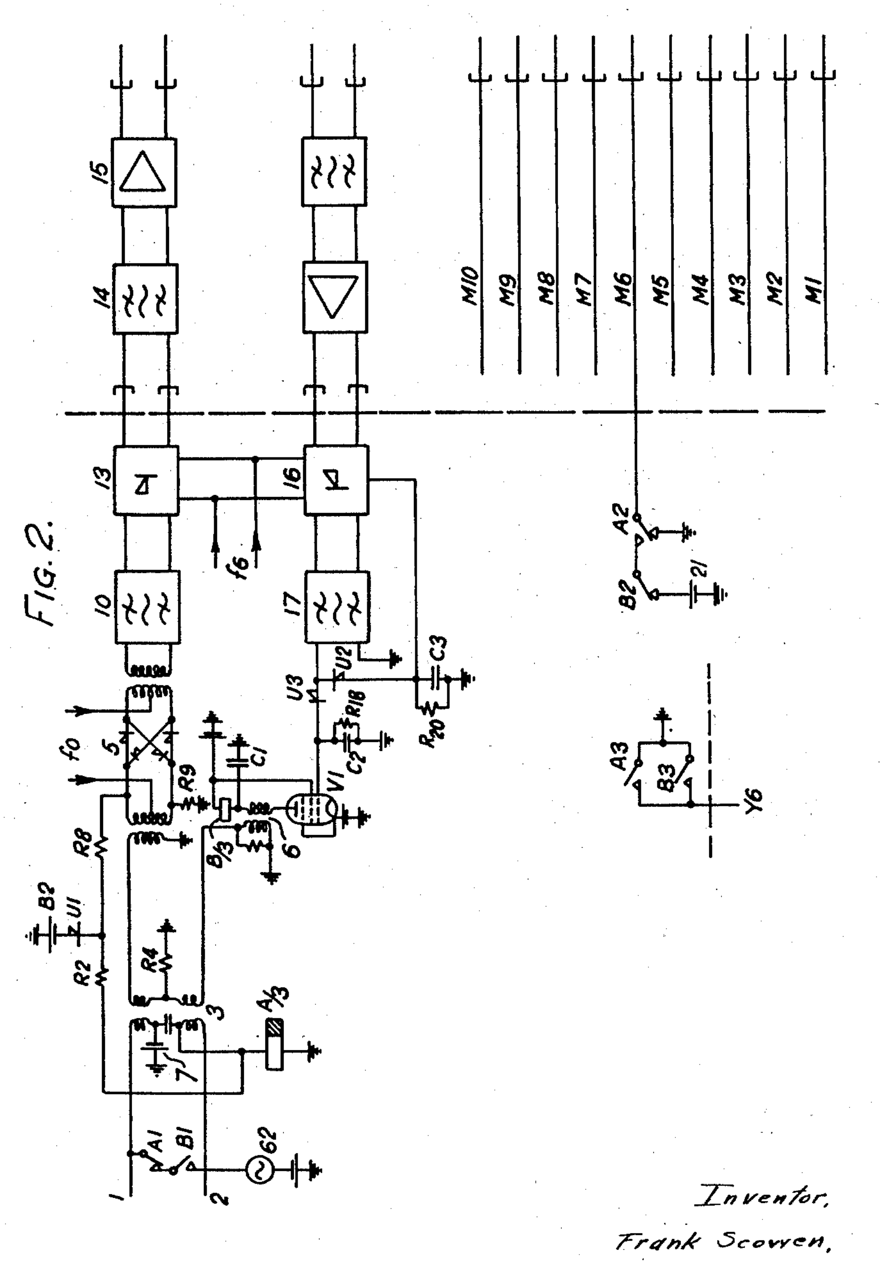
Figure 3:
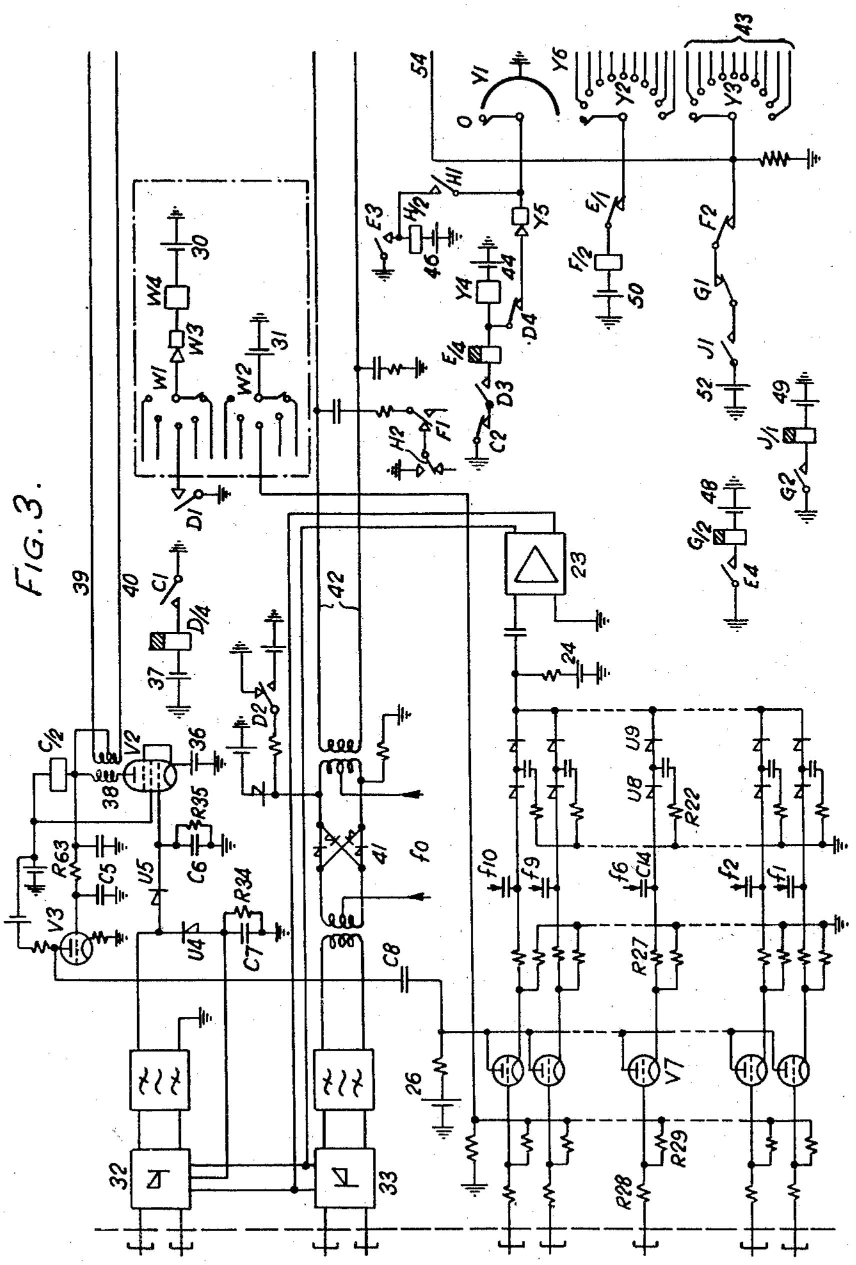
Figure 4:
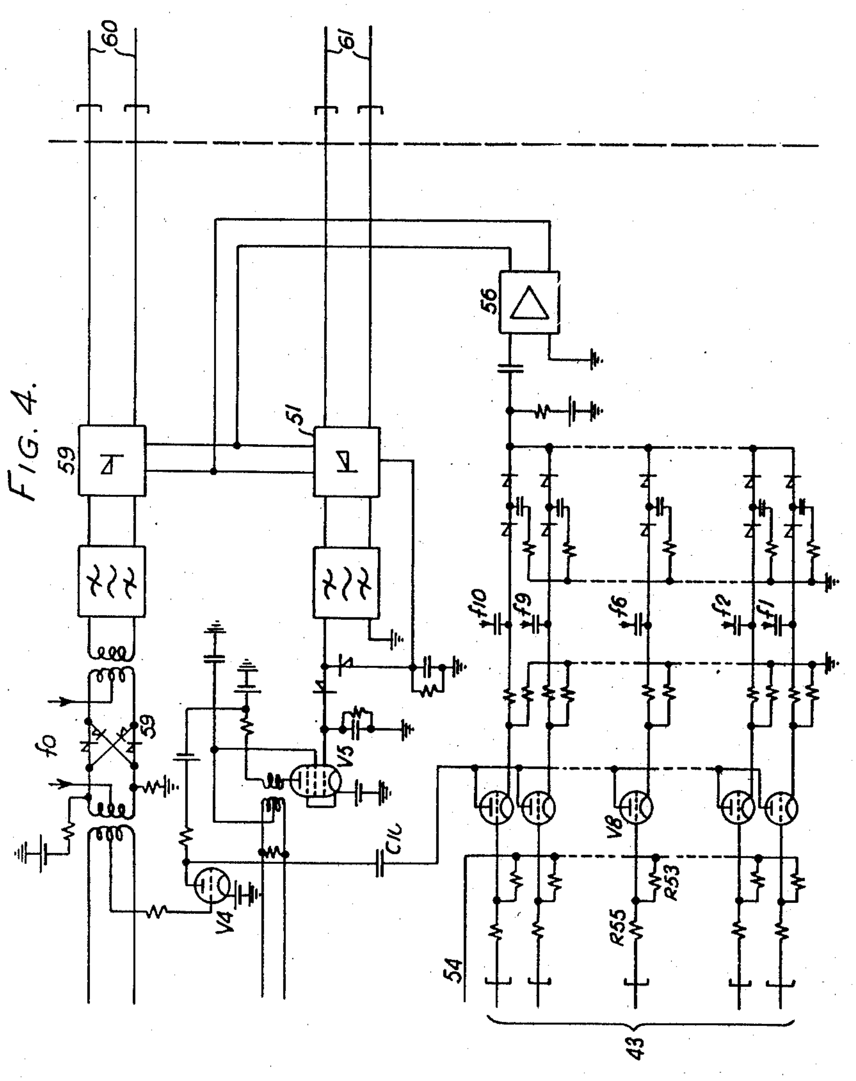

In order that the invention may be more clearly described, gating circuits arranged to operate in accordance therewith in a switching system for an automatic telephone exchange will now be described in greater detail by way of example with reference to the accompanying drawings in which:

Fig. 1 is a block diagram showing the essential elements of the switching system and Figs. 2, 3 and 4 are circuit diagrams of a ten-line automatic exchange including gating circuits which form the subject of the present invention.

With reference to Fig. 1, four input circuits are shown numbered 1, 2, 3 and 4, connected through a common junction line to a number of output circuits of which only two, 11 and 12 are shown. Taking circuit number 1 as an example, a signal applied to its input terminals is first limited in frequency bandwidth to an upper frequency limit of say *fh* cycles per second, by means of a wave filter WF1 of any suitable type. This limited frequency signal is then used to modulate a carrier of frequency *fo* cycles per second via frequency changer FC1. The carrier frequency *fo* is common to all input circuits. The output from FC1 passes through a wave filter WF2 which selects the first order upper and lower side bands and frequency *foc/s* within the frequency band *fo*—*fh* cycles per second to *fo*+*fh*. The frequency band output from wave filter WF2 is then used to modulate a second carrier of frequency $fc$. This second carrier frequency is different for each input circuit and in the cases of input circuits 2, 3 and 4, is represented by $fc+fs$, $fc+2fs$ and $fc+3fs$ respectively. Under the following conditions, $$fs>2fh$$

$$fo>\frac{(N-1)}{2}fs+fh$$

where N is the number of input circuits, in this case 4

$$fc>2(fo+fh)$$

the lower sidebands of the second carrier frequencies, which occupy the frequency band $fc-fo-fh$ to $fc+(N-1)fs-fo+fh$ cycles per second, do not overlap each other nor are they overlapped by any other sidebands or direct unmodulated signals that leak through the second modulators. The outputs from each input circuit are then commoned and passed through a wave filter WF3 which selects the lower side bands lying in a frequency band $fc-fo-fh$ to $fc+(N-1)fs-fo+fh$ cycles per second. This part of the circuit may also include a suitable uni-directional amplifier.

It will be apparent that with suitable selection of carrier frequencies the upper side bands of the second modulation carrier frequencies can also be used and would not experience mutual interference. In this case wave filter WF3 would be designed to pass these upper side bands instead of the lower.

In either case, any one of the input circuits can be connected to any one of the output circuits by applying to the appropriate frequency changer in the desired output circuit a frequency the same as that applied to the second modulator of the input circuit to which connection is to be made. It will be appreciated that the frequency band $fc-fo+fh$ to $fc+(N-1)fs-fo+fh$ cycles per second can be used as a basis for further modulation, taking the place of the band $fo-fh$ to $fo+fh$ cycles per second.

In Fig. 1, a switching system for establishing communication in opposite directions is shown. Input circuit (1, 1') is shown connected to output circuit (12, 12') and input circuit (4, 4') is connected to output circuit (11, 11'). The frequency selecting circuits S11, S12 are controlled from the input circuits or from an external device and operates to connect to the frequency changers FC3 and FC2' any one of the second carriers employed in the input circuits. Thus, in the example illustrated, a frequency of $fc+3fs$, corresponding to input circuit 4, is applied to frequency changers FC3 and FC2' of output circuit 11, and the output after passing through wave filter WF4', which passes only frequencies within the band $fo+fh$ to $fo-fh$ cycles per second, is applied to the detector FC4 and final filter WFS' which again limits the upper frequency of the output signal to $fh$ cycles per second.

Similarly, by applying a carrier frequency of $fc$ cycles per second to frequency changer FC3 of output circuit 12, this circuit is placed in connection with input circuit 1.

In order to permit communication in the reverse direction to that described, incoming signals after transmission through the wave filter WF1' are made to modulate a carrier frequency $fo$ which is applied with the incoming signal to the frequency changer FC1'. Thereafter the signal is passed through the succeeding wave filters and associated components in a similar manner but in the reverse direction to that already described.

As shown, each output circuit will need a frequency selector circuit which includes all the second carrier frequencies used in the switch, and in the case of, for example, a 100 input circuit switch, this would make the equipment expensive and elaborate. However, by appropriate selection of frequencies the number to be made available to the frequency selector circuit can, in the case of the 100 input circuit switching system be reduced to 20. The 20 circuits are divided into two sets of 10 the first of which controls the frequencies X1, X2 to X10, and the other set controls the frequencies Y1, Y2 to Y10. The separations between the successive frequencies of the set X1 to X10 are the same as those between the successive frequencies $fc$, $fc+fs$, $fc+2fs$ of the second modulation carriers, and the separations between successive frequencies of the set Y1 to Y10 are ten times the separations between successive frequencies of the $fc$ series. The actual X and Y frequencies are chosen so that:

$$Y1-X1=fc$$
$$Y1-X2=fc+fs$$
$$Y1-X10=fc+9fs$$
$$Y2-X10=fc+19fs$$
$$Y10-X10=fc+99fs$$

where $$Y1<Y2<Y3\ldots<Y10$$

and $$X1>X2>X3\ldots>X10$$
$$X1<fc$$

or $$X1>fc+99fs$$

and $$Y1>fc+99fs$$

Thus, if one output from the X series and one output from the Y series are connected to a suitable frequency changer and wave filters any one of the second carrier frequencies can be selected.

The circuits employed for selecting the appropriate second carrier frequencies will be described fully in connection with the 10 line automatic telephone exchange illustrated in Figs. 2, 3 and 4.

This exchange consists of a switch with 10 input circuits and an even number (not exceeding 10) of output circuits connected together in pairs. Each pair of output circuits is called a trunk and serves to connect together a pair of calling and called subscribers. The trunks are under the control of a single trunk marker and of individual register markers. In each trunk one output circuit acts as a line finder, which under the control of the trunk marker becomes connected to the calling subscriber. The other output circuit under the control of the register marker is connected to the called subscriber.

The input and output circuits of the switch are 4-wire circuits. The input 4-wire circuits are converted to 2-wire circuits by means of hybrid transformers and the subscriber's lines are connected to the 2-wire circuits. Briefly, the exchange operates so that the single trunk-marker apparatus marks a free trunk which is seized by the subscriber who next lifts his receiver to make a call. The seized trunk becomes engaged and the trunk-marker hunts for and marks another free trunk. The seized trunk transmits a dialling tone to the calling subscriber who thereupon dials the number of the subscriber to whom he wishes to be connected. The register marker apparatus in the seized trunk responds to the dialling and either transmits busy tone back to the calling subscriber if the called subscriber is busy, or connects the trunk to the called subscriber if the latter is free. Ringing is initiated by the called subscriber input circuits. The trunk is released when the calling subscriber clears.

The operation of the exchange will now be described in detail with reference to Figs. 2, 3 and 4 which show one subscriber's circuit only and one set of associated equipment, it being understood that the other nine sets are similar.

The apparatus associated with each subscriber's line is shown to the left of the vertical dashed line in Fig. 2. 1 and 2 represent a pair of wires to a subscriber's telephone instrument which is a normal common battery instrument with a dial, these wires being connected to the two-wire side of the hybrid transformer 3. R4, the balance impedance, is of a value approximately equal to the impedance of the subscriber's lines when the exchange introduces no gain in a connection between two subscribers. The four-wire sides of the hybrid transformer 3 are connected to the frequency changer 5 and to the transformer 6. A carrier of frequency *fo* cycles per second is supplied to frequency changer 5 which is normally balanced so that no carrier signal is transmitted onwards. When the subscriber lifts his instrument a conductive connection is made between the two wires 1 and 2 and current flows from the battery 7 connected to the two-wire winding of transformer 3 through the instrument, the wires 1 and 2 and a relay A/3. The resulting potential drop across relay A/3, limited to a certain value by resistor R2, rectifier U1 and a battery B2 is applied via resistors R8 and R9 to frequency changer 5 and so produces a condition of unbalance which causes a signal of frequency *fo* cycles per second to be transmitted to wave filter 10. This signal has an amplitude dependent upon the limited potential difference produced at the junction of resistor R2, rectifier U1 and resistor R8 and is practically independent of the amplitude of the carrier frequency applied to the frequency changer 5.

If now the calling subscriber speaks into his instrument he modulates the direct current flowing through it and the audio frequency components thereof pass through transformer 3 to frequency changer 5 where they modulate the carrier frequency *fo* cycles per second producing upper and lower side bands which together with the constant amplitude signal or frequency *fo* cycles per second from the unbalanced frequency changer 5 pass through the wave filter 10. Transformer 3 and the input transformer of the frequency changer 5 are designed to eliminate audio frequencies higher than *fh* cycles per second. The side bands of the controlled amplitude carrier signal *foc/s* then pass through the frequency changer 13 to which a carrier of frequency *fc* cycles per second (here shown as *f6*) is supplied, this frequency being one of ten, each of which is individual to one subscriber. The outputs from the frequency changers 13 in each of the 10 subscriber's circuits are commoned and passed through the filter 14 which allows only the lower side bands of the second modulation frequencies to pass. An amplifier 15 which follows frequency changer 14 produces amplification in the transmitted signal which makes up for some or all of the losses in the preceding components.

In the other direction of transmission, the frequency changer 16, supplied with a carrier of frequency *f6* cycles per second and filter 17 allow signals of only one channel to be transmitted to a speech detector consisting of rectifier U3, capacitor C2 and resistor R18 and to an automatic gain control detector consisting of rectifier U2, capacitor C3 and resistor R20. A unidirectional voltage component will appear across C2 and R18 due to the rectification of the carrier frequency *fo*. The cathode of valve V1 is kept at a potential sufficiently above that of its grid and also above earth potential to suppress the flow of anode current. The rectified carrier signal applied to the grid of the valve V1 raises its potential sufficiently to bias this valve to its operating state and therefore anode current commences to flow through the valve and a relay B/3 in its anode circuit. Relay B/3 operates and the anode current will subsequently follow any audio frequency voltages appearing across capacitor C2 and resistor R18 as a result of the detection of side bands accompanying the carrier frequency. These audio frequency signals are transmitted to the subscriber's line via transformers 3 and 6.

The rectified unidirectional component produced by rectifier U2 is applied by means of the resistor capacitor combination R20, C3 to frequency changer 16, where it is used to control the conversion loss or gain and to keep the fed back potential difference reasonably constant which in effect controls the gain or loss of the circuit.

When, for example the sixth subscriber initiates a call by lifting his instrument current will flow through relay A/3 as earlier described and the relay operates. Contact A1 disconnects contact B1 of relay B/3 from the subscribers lines 1, 2; contact A2 connects a potential of 100 volts from battery 21 to the calling subscriber's marker lead (shown in the diagram as M6) and contact A3 applies an earth to lead Y6 of the register marker switch Y2 and Fig. 3 and this earth marks the calling subscriber busy.

In the exchange being described, each trunk has ten gating circuits associated with it, the gating circuits comprising trigger circuits and variable attenuator circuits. Each trigger controls one of the second modulator frequencies used in the input circuits.

The marker lead M6 is connected to a gating circuit the trigger portion of which controls the supply of the second modulating carrier of appropriate frequency. Two rectifiers U8, U9 and resistor R22 form a T network whose attenuation varies according to the bias applied to it. A carrier signal of frequency *f6* cycles per second is applied to one side of the network via capacitor C14 while the other side is connected via an amplifier 23 to a modulator in the trunk circuit. A battery 24 biasses both rectifiers to a non-conducting portion of their characteristics so that normally the T network prevents frequency *f6* being applied to the trunk circuit.

The impedance network U8, U9, R22 is connected in the cathode circuit of a thyratron type valve V7 via resistor 27 so that when anode current flows through V7 a potential will be applied to the impedance network in opposition to that of battery 24. When the potential of the grid of V7 is, for example, less than 70 volts above the potential of the cathode the valve does not conduct. When the potential of the grid exceeds that of the cathode by more than say 75 volts, the valve conducts and continues to conduct irrespective of the grid-cathode potential difference.

Two resistors R28 and R29 have their junction connected to the grid of valve V7 and the free end of R29 is connected via a trunk marker mechanism described in more detail later to a potential of either zero or 100 volts. The values of resistances R28 and R29 are adjusted so that when the potential of the free end of R29 is raised to 100 volts a potential of about 50 volts is applied to the grid of the valve V7 and is insufficient to cause it to strike. If, however, the free end of resistor R28 is also connected to a 100 volts potential the grid potential of the valve will rise to 100 volts and cause it to start conducting. The anode current which flows will bias the impedance network U8, U9 and R22 to a conducting condition and so the network will allow the carrier frequency *fc* to be applied to the selected trunk. As was described earlier valve V7 continues to conduct even if R28 and R29 are disconnected from their respective sources of potential. At the end of the call, the thyratron type valve V3 operates, in a manner to be described later, to reduce the anode potential of valve V7 and to return this valve to its non-conducting condition.

Fig. 3 shows the line finder, common trunk marker and individual register marker sections of the circuit while Fig. 4 shows the final selector section. In the line finder portion of the trunk, the cathode of valve V2 is biassed positively with respect to the grid, therefore normally no anode current flows, and a relay C/2 in the anode circuit of V2 is unoperated. Contact C1 of relay C/2 controls a "slow to release" relay D/4, one contact D1 of which serves when operated to apply an earth connection to the contact associated with the trunk on bank W1 of the trunk marker. The actuating mechanism of the wiper of bank W1 is arranged so that the wiper can rest only on a contact not connected to earth. However, should the wiper rest on an earth contact current will flow from the battery 30 through the wiper actuating mechanism which consists of a drive magnet W4 and interrupter contacts W3 to the earthed contact. This causes the drive magnet to open the interrupter contacts W3, thus interrupting the current and releasing the drive magnet W4 which causes the wiper to step on to the next contact. When W4 is fully released, contacts W3 close. Thus the wipers of the trunk marker will only remain in a position such that the wiper of the trunk W1 is on a contact isolated from earth.

A second bank W2 of the trunk marker has its wiper connected to a 100 volt battery 31 as shown while its contacts are connected to the ends of the resistors R29 in each trigger circuit of the trunk corresponding to the contact of bank W2, so when the wiper of bank W1 rests on a "free" trunk, a potential of 100 volts is applied to part of all the trigger circuits associated with that trunk.

The corresponding free ends of all resistors R28 of all the triggers controlling, say, frequency *f1* of all output circuits used as line finders are connected together and to the A2 contact of the subscriber whose input circuit uses a second carrier of this frequency, in this case subscriber No. 1. Similarly, all resistors R28 trigger leads controlling the frequency *f2* are connected to the A2 contact of subscriber No. 2 and so on. Thus when subscriber No. 6 lifts his receiver to make a call, his A/3 relay operates and the A2 contacts apply a potential of 100 volts to the lead common to all the resistors R28 of all triggers in the circuits controlling carrier frequency *f6* in the line finder output circuits. Trigger No. 6 of the line finder output circuit of the marked free trunk will therefore operate, and the current flowing in the cathode circuit of the operated trigger valve corresponding to V7 will allow the carrier of frequency *f6* to pass to the amplifier 23 and thence to the frequency changers 32 and 33. Frequency *f6* is, of course, the same as that supplied to frequency changers 13 and 16 in the calling subscriber's circuit and so the calling subscriber is connected to the line finder output circuit of the marked trunk. The controlled amplitude signal of frequency *foc/s* produced in the unbalanced frequency changer 5 will now appear at the junction of rectifiers U4 and U5. The negative rectified potential difference across capacitor C7 and resistor R34 is fed back to frequency changer 32 and serves to adjust the conversion gain or loss of that unit and so to bring the rectified potential across C7 and R34 to a predetermined value. The positive rectified potential difference across C6 and R35 overcomes the positive bias applied to the cathode valve V2 by means of battery 36 and brings the valve into its conducting range and anode current which subsequently flows operates relay C/2. Contacts C1 close and current flows from battery 37 through "slow to release" relay D/4 and operates it. Contacts D1 of relay D/4 operate and apply an earth to the corresponding contact on bank W1 of the trunk marker mechanism thus marking the trunk busy and causing the wiper to move on to the next free contact as explained above while the 100-volt potential applied via bank W2 to the trigger circuits of the seized trunk is removed.

The anode current flowing through V2 causes a drop in the potential of the junction between relay C/2 and transformer 38 which is applied to the earth phantom circuit of the leads 39, 40 of the output side of transformer 38.

Contacts D2 close when relay D/4 operates and apply a limited potential to the balanced frequency changer 41 to which the frequency *foc/s* is supplied. The unbalanced condition produced sends a signal of frequency *foc/s* through the frequency changer 33, where it modulates a carrier *f6* and after passing through frequency changer 16 appears at the junction of rectifiers U2 and U3 in the calling subscriber's circuit. Part of this output is fed back as explained above to adjust the loss of the circuit between frequency changers 41 and the junction of rectifiers U2 and U3. The positive potential appearing across capacitor C2 and resistor R18 applied to the grid of valve V1 overcomes the positive cathode bias and the valve conducts. Relay B/3 connected in the anode circuit of valve V1 operates and contacts B2 thereof open to remove the 100-volt potential from the lead connected to all triggers No. 6 in the line finder circuits. At this stage the free ends of all resistors R28 and R29 of all trigger circuits in the seized trunk are at earth potential.

The anode of valve V7 and the corresponding anodes of valves in the trigger circuits of that trunk are paralleled and connected to battery 26 through a common resistor. When any of these valves starts to conduct the potential at the junction between the paralleled anodes and the common resistor drops suddenly and this drop in potential is applied through capacitor C8 to the anode of a further gas discharge tube V3, thus, if at the start of a call V3 was in the operated condition a drop in potential at the anode of one of the valves V7 on conduction will cause V3 to become unoperated.

The dial tone is applied to leads 42 via contacts H2 and F1 which are normally in the position indicated and this tone is transmitted via frequency changers 41 and 16 to the calling subscriber. On hearing the tone, this subscriber proceeds to dial the digit corresponding to the subscriber to whom he wishes to be connected. The contacts on the dial interrupt the current flowing in the calling subscriber's line and at each interruption frequency changer 5 will return to its balanced state and so the signal of frequency *foc/s* appearing on the output of 5 and at the junction of rectifiers U4 and U5 will be interrupted in sympathy. The anode current of valve V2 will also follow this interruption and relay C/2 will release accordingly. Relay D/4 will remain operated during the dialling period because it is of the "slow to release" type. Drive magnet Y4 of the register marker mechanism in cooperation with interruptor contacts Y5 and the contacts C2, D3 and D4 actuate wiper arms moving over the three banks of contacts Y1, Y2 and Y3. Contact bank Y1 is simply a ring which is connected to earth. The contacts in bank Y2 are each connected to the busy contacts A3 and B3 of each subscriber. The contacts of bank Y3 are each connected to one lead 43 of the called subscriber trigger circuit markers. Contact C2 of relay C/2 responds to the dialling interruptions and as contact D3 of relay D/4 is closed drive magnet Y4 is impulsed from battery 44 in sympathy. The wipers of switch Y will therefore step round to the contacts corresponding to the digits dialled. During this period contacts D4 operated disconnect drive magnet Y4 from the interruptor contacts Y5. Another "slow to release" relay E/4 in series with drive magnet Y4 is also operated and remains so during the dialling period. One contact E1 thereof opens a circuit between battery 50, relay F/2 and the wiper moving over bank Y2. Further contacts E3 close and operate relay H/2 in series with battery 46. Contacts H1 of relay H2 close and lock this relay in its operated position because of the earth present on the bank Y1 of switch Y, while contacts H2 of relay H/2 disconnect the dial tone applied via lines 42. A further set of contacts E4 of relay E/4 apply current from battery 48 to another "slow to release" relay G/2, contacts G2, of which allow current from battery 49 to flow through relay J/1 also of the "slow to release" type.

Shortly after the end of the dialling period relay E/4 releases and contacts E1 close and connect relay F/2 to battery 50 via the contact on bank Y2 which is connected to contacts A3 of the called subscriber's circuit. If the called subscriber is engaged one or other or both of his contacts A3 and B3 will be operated in a manner similar to that described above so the contact on bank Y2 will be earthed and relay F/2 will be operated. Contacts F1 of relay F/2 would close and busy tone would be applied from contact F1 to lines 42, and contacts F2 will operate to prevent the called subscriber being connected. If the called subscriber is free relay F2 does not operate.

When relay E/4 releases shortly after the end of the dialling period, contacts E4 will disconnect relay G/2 from battery 48 and contacts G2 will disconnect the relay J1 from the battery 49 and after a short pause this relay will release. During the release period of relay J/1, contacts J1 will connect the 100-volt supply 52 via contacts G1 and F2 now unoperated to the contact of bank Y3 corresponding to the called subscriber. Thus the potential of 100 volts will be applied to one part of the trigger circuits in the final selector circuit shown in Fig. 4. These trigger circuits are connected in a corresponding manner to that already described. All the free ends of resistors R53 in the trigger circuits associated with one trunk are connected via lead 54 to the terminal end of the wiper of contact bank Y3 and the free ends of resistors R55 in corresponding trigger circuits in each trunk are connected to the appropriate contact on the bank Y3, so that, when the wiper of bank Y3 steps on a selected contact 100 volts is applied via lead 54 to one part of the trigger circuit of the selected trunk while 100 volts is also applied to the other part of the trigger circuit controlling the frequency corresponding to the called subscriber via bank Y3. The selected trigger circuit will operate and allow a carrier frequency corresponding to the second carrier frequency of the called subscriber to be applied via amplifier 56 to frequency changers 57 and 58 of the final trunk selector. The drop in anode potential of the corresponding valve V8 in the operated trigger circuit is transferred via condenser C10 to the anode of the thyratron valve V4 which is thereby restored to an unoperated condition should it have been operated. Frequency changer 59 is permanently unbalanced and a control signal of frequency *foc/s* will be transmitted to the junction of rectifiers U2 and U3 in the called subscriber's apparatus. This called subscriber's apparatus is not shown in Fig. 4, but it will be similar to that shown on the left of the dotted line in Fig. 2 and will be connected to the commoned leads 60, 61, in Fig. 4. The operation of the called subscriber's apparatus will be somewhat similar to that of the calling subscriber already described. The automatic gain potential is developed across capacitor C3 and resistor R20 and a positive potential developed across C2 and R18 will make the valve V1 conduct. Relay B/3 will operate and contacts B1 will close and connect the ringing generator 62 to the called subscriber's line. Contacts A1 will of course be unoperated. Contacts B2 will operate to disconnect the 100-volt potential from the contacts A2 and contacts B3 will mark the called subscriber busy. When the called subscriber answers, the current which flows through his line and instrument operates relay A/3 and contacts A1 thereof disconnect the ringing generator 62 from his line. The called subscriber is prevented from seizing a free trunk because of the operation of contacts B2.

When the calling subscriber clears, he open circuits his loop and current ceases to flow through relay A/3. Frequency changer 5 returns to its balanced condition so that no signal of frequency *fo* is transmitted and the valve V2 ceases to conduct causing relay C2 to return to its unoperated condition. Contacts C1 release relay D/4 and contact D1 removes the busy signal from the trunk contacts of bank W1 of the trunk marker. Contacts D4 connect the drive magnet Y4 to the interruptor contacts Y5 the drive magnet Y4 and contacts Y5 then being connected to battery 44 and the earth ring at bank Y1. The switch then self-drives until the wipers of switch Y are on the home contacts when the switch stops and the hold circuit of relay H/2 is disconnected from battery 46 because the home contact on bank Y1 is not earthed, and relay H/2 releases. Contacts H2 thereof restore dial tone to the trunk. If the called subscriber is busy, relay F/2 will be released when the wiper on bank Y2 returns to the home position marked O.

The network R63 C5 is given a time constant such that the potential across C5 does not follow dialling impulses and when the current through valve V2 has ceased for a sufficiently long period, the potential of the grid of valve V3 rises sufficiently to cause the valve to strike. The resultant drop in anode potential is transferred to the anodes of the valves in the trigger circuits of the line finder output circuit of the trunk and restores the trigger corresponding to the calling subscriber to an unoperated condition, this disconnecting the carrier frequency applied to the trunk circuit. The rise in potential of the lower end of relay C/2 is transmitted over the earth phantom circuit of leads 39, 40 to the grid of valve V4 and causes it to strike. The drop in potential of the anode valve V4 is transferred by capacitor C10 to the anodes of the trigger valves V8 and restores the trigger corresponding to the called subscriber. As the trigger corresponding to the called subscriber is not operated until the end of the dialling period there is no need for the grid of valve V4 to be isolated from dialling signals as was necessary in the case of valve V3.

Valve V5 and its associated circuit components operate in a manner substantially similar to that of valve V2 with the exception that V5 has no relays associated with it.

Although the invention has been described in its application to a telephone system in which carrier frequencies are used to effect switching, it will be understood that the gating circuits described can be used to control other forms of signal and for example, they can be used in a telephone system in which pulse multiplex switching is employed.

I claim:

1. An electronic gating circuit comprising in combination a trigger circuit having at least two operating leads a restoring lead and an output lead, and a variable attenuation circuit, the variable attenuation circuit having an input and an output circuit and a control lead and means for connecting said control lead to said output lead.

2. In an electronic switching system comprising in combination an electronic gating circuit including a trigger circuit having at least two operating leads, a restoring lead and an output lead and a variable attenuation circuit, the variable attenuation circuit having an input and an output circuit and a control lead and means for connecting said control lead to said output lead, at least two sources of marking potentials, means for applying said marking potentials separately to said operating leads, a source of restoring potential and means for applying said restoring potential to said restoring lead, the method of operating said gating circuit so that only when said marking potentials are applied simultaneously to at least two operating leads does the trigger circuit operate and produce an electrical output stimulus on said output lead, said output stimulus remaining present when any of the marking potentials are removed and said output stimulus is removed from the trigger circuit output lead only by the application of said restoring potential to the gating circuit restoring lead.

3. An electronic gating system comprising in combination a plurality of gating circuits, each of said gating circuits including a trigger circuit having an input circuit operating lead, an input circuit marking lead, a restoring lead, an output lead and a variable attenuation circuit having an input and an output circuit and a control lead and means for connecting said control lead to said output lead, a common output circuit marking lead, a common restoring lead, a plurality of signal sources and a common output circuit for said variable circuits, means for connecting the input circuit operating lead in each trigger circuit to said common output circuit marking lead, means for connecting each gating circuit restoring lead to said common restoring lead, means for connecting the input circuit of each variable attenuation circuit to a separate signal source in said plurality of signal sources and means for connecting the output circuit of each variable attenuation circuit to said common output circuit.

4. An electronic gating circuit comprising in combination a gas discharge tube having a cathode, a control electrode and an anode, a source of positive potential, an anode load impedance, at least two operating leads connected to said control electrode, an output lead connected to said cathode, a restoring lead connected to said anode, a variable attenuation circuit having an input and an output circuit and a control lead connected to said output lead and a resistor connected between said cathode and earth.

5. An electronic gating circuit according to claim 4 in which the variable attenuation circuit is constituted by a resistor-capacitor-rectifier combination.

FRANK SCOWEN.

REFERENCES CITED

The following references are of record in the file of this patent:

UNITED STATES PATENTS

| Number | Name | Date |
|---|---|---|
| 2,471,138 | Bartelink | May 24, 1949 |